US009445296B2

(12) United States Patent
Pan et al.

(10) Patent No.: US 9,445,296 B2
(45) Date of Patent: Sep. 13, 2016

(54) METHOD, SYSTEM, AND DEVICE FOR CONFIGURING CHANNEL MEASUREMENT AND DL CSI FEEDBACK

(71) Applicant: China Academy of Telecommunications Technology, Beijing (CN)

(72) Inventors: Xueming Pan, Beijing (CN); Zukang Shen, Beijing (CN); Jing Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 11 days.

(21) Appl. No.: 14/401,841

(22) PCT Filed: Dec. 31, 2012

(86) PCT No.: PCT/CN2012/088132
§ 371 (c)(1),
(2) Date: Nov. 18, 2014

(87) PCT Pub. No.: WO2013/170618
PCT Pub. Date: Nov. 21, 2013

(65) Prior Publication Data
US 2015/0146557 A1    May 28, 2015

(30) Foreign Application Priority Data

May 18, 2012  (CN) .......................... 2012 1 0157292

(51) Int. Cl.
*H04L 12/26*        (2006.01)
*H04W 24/10*        (2009.01)
(Continued)

(52) U.S. Cl.
CPC ............ *H04W 24/10* (2013.01); *H04L 5/0051* (2013.01); *H04L 5/0053* (2013.01); *H04L 5/0094* (2013.01); *H04L 25/0202* (2013.01)

(58) Field of Classification Search
USPC ................ 370/236, 241, 252, 328, 329, 330
See application file for complete search history.

(56) References Cited

U.S. PATENT DOCUMENTS

| 2012/0120846 A1* | 5/2012 | Hwang | ................. | H04W 24/10 370/254 |
| 2012/0176925 A1* | 7/2012 | Hwang | ................. | H04W 24/10 370/252 |

(Continued)

FOREIGN PATENT DOCUMENTS

| CN | 101267285 A | 9/2008 |
| CN | 102025411 A | 4/2011 |

(Continued)

OTHER PUBLICATIONS

CATT: "Discussion on CSI feedback modes for CoMP", 3GPP Draft; R1-121090, 3RD Generation Partnership Project (3GPP), Mobile Competence Centre ; 650, Route Des Lucioles ; F-06921 Sophia-Antipolis Cedex , France, vol. RAN WG1, no. Jeju, Korea; 20120326-20120330, Mar. 20, 2012, XP050599393, [retrieved on Mar. 20, 2012].

(Continued)

*Primary Examiner* — Kwang B Yao
*Assistant Examiner* — Nguyen Ngo
(74) *Attorney, Agent, or Firm* — Kilpatrick Townsend & Stockton LLP

(57) ABSTRACT

Embodiments of the present invention relate to the technical field of wireless communications, and in particular, to a method, system, and device for configuring channel measurement and DL CSI feedback, so as to implement measurement in a dynamic TDD system. The method for configuring channel measurement according to the embodiment of the present invention comprises: a network side device dividing downlink subframes into multiple downlink subframe groups according to an interference condition on the downlink subframes; and the network side device notifying a user equipment of channel measurement configuration information corresponding to the downlink subframe groups. The network side device notifies the user equipment of the channel measurement configuration information corresponding to the multiple downlink subframe groups that are obtained according to the interference condition on the downlink subframe, thereby implementing measurement in the dynamic TDD system.

8 Claims, 4 Drawing Sheets

(51) Int. Cl.
*H04L 5/00* (2006.01)
*H04L 25/02* (2006.01)

(56) References Cited

U.S. PATENT DOCUMENTS

| | | | | |
|---|---|---|---|---|
| 2012/0201154 A1* | 8/2012 | Chandrasekhar | ..... | H04W 24/10 370/252 |
| 2013/0003788 A1* | 1/2013 | Marinier | ................ | H04B 7/024 375/219 |
| 2013/0196675 A1* | 8/2013 | Xiao | ................... | H04W 72/082 455/452.1 |
| 2013/0301448 A1* | 11/2013 | Sayana | ................ | H04W 24/10 370/252 |
| 2013/0301450 A1* | 11/2013 | Geirhofer | ............. | H04B 7/024 370/252 |
| 2013/0315197 A1* | 11/2013 | Park | ................... | H04W 72/042 370/329 |
| 2014/0086166 A1* | 3/2014 | Lindbom | ............. | H04W 52/16 370/329 |

FOREIGN PATENT DOCUMENTS

| | | |
|---|---|---|
| CN | 102281638 A | 12/2011 |
| KR | 20090087043 A | 8/2009 |
| KR | 20100106504 A | 10/2010 |
| WO | 2012/015154 A1 | 2/2012 |
| WO | 2012/045770 A1 | 4/2012 |

OTHER PUBLICATIONS

CATT: "Periodic CSI reporting for multiple DL CCs in LTE-A Rel-11", 3GPP Draft; R1-122024, 3RD Generation Partnership Project (3GPP), Mobile Competence Centre ; 650, Route Des Lucioles , F-06921 Sophia-Antipolis Cedex ; France, vol. RAN WG1, no. Prague, Czech Republic; 20120521-20120525, May 12, 2012, XP050600315, [retrieved on May 12, 2012].
Panasonic: 'CSI feedback configuration, triggering, and behavior', 3GPP Draft; R1-122188, 3RD Generation Partnership Project (3GPP), Mobile Competence Centre ; 650, Route Des Lucioles ; F-06921 Sophia-Antipolis Cedex ; France, vol. RAN WG1, no. Prague, Czech Republic; 20120521-20120525, May 12, 2012, XP050600452, [retrieved on May 12, 2012].
Extended European Search Report issued on Jun. 19, 2015 in the EP counterpart application (12877027.8).
The Office Action issued on Sep. 16, 2015 in the KR counterpart application (10-2014-7035446.
The Office Action issued on Nov. 9, 2015 in the JP counterpart application (2015-511904).
International Search Report for PCT/CN2012/088132.

* cited by examiner

METHOD, SYSTEM, AND DEVICE FOR CONFIGURING CHANNEL MEASUREMENT AND DL CSI FEEDBACK

This application is a US National Stage of International Application No. PCT/CN2012/088132, filed on 31 Dec. 2012, designating the United States, and claiming the benefit of Chinese Patent Application No. 201210157292.0, filed with the Chinese Patent Office on May 18, 2012 and entitled "Method, system, and device for configuring channel measurement and DL CSI feedback", which is hereby incorporated by reference in its entirety.

FIELD OF THE INVENTION

The present invention relates to the technical field of wireless communications and particularly to a method, system and device for configuring channel measurement and Downlink (DL) Channel State Information (CSI) feedback.

BACKGROUND OF THE INVENTION

For general duplex schemes adopted in a cellular system, a Time Division Duplex (TDD) mode refers to transmitting uplink/downlink signals in different periods of time over the same operating frequency band in the uplink/downlink, where there is a Guard Period (GP) between the uplink and the downlink; and a Frequency Division Duplex (FDD) mode refers to transmitting uplink/downlink signals concurrently over different frequency carriers in different operating frequency bands in the uplink/downlink, where there is a Guard Band (GB) between the uplink and the downlink.

The frame structure of a Long Term Evolution (LTE) TDD system is somewhat complicated. As illustrated in FIG. 1, a radio frame with a length of 10 ms includes 10 sub-frames in total including special sub-frames and normal sub-frames, where each sub-frame is 1 ms in length. The special sub-frame includes three time slots: a Downlink Pilot Time Slot (DwPTS), a GP (a Guard Period between the downlink and the uplink) and an Uplink Pilot Time Slot (UpPTS). The normal sub-frames include uplink sub-frames and downlink sub-frames for transmitting uplink/downlink control channels, traffic data, etc. Particularly a radio frame can be configured with two special sub-frames (in the sub-frames 1 and 6) or can be configured with one special sub-frame (in the sub-frame 1). The sub-frame 0 and the sub-frame 5, and the DwPTS(s) in the special sub-frame(s) are usually used for downlink transmission, the sub-frame 2 and the UpPTS(s) in the special sub-frame(s) are usually used for uplink transmission, and the remaining sub-frames can be configured for uplink transmission or downlink transmission as needed.

Uplink/downlink signals are transmitted in different sub-frames over the same frequency resources in the uplink/downlink in the TDD system. In common TDD systems including a 3G Time Division-Synchronized Code Division Multiple Access (TD-SCDMA) system and a 4G TD-LTE system, uplink and downlink sub-frames are divided statically or semi-statically, and the common practice is to determine the proportion of uplink to downlink sub-frames according to the cell type and the rough traffic proportion and keep the proportion unchanged in the network planning process. This is a simple but working practice in the context of large coverage by a macro cell. However an increasing number of low-power base stations such as a pico cell, a home NodeB, etc., have been deployed for small local coverage along with the advancement of technologies, and the number of users is small and the traffic demand of the users varies significantly in these cells, thus resulting in a dynamically varying proportion of uplink to downlink traffic as needed in the cells.

In the case that a plurality of cells are deployed in the network, different cells in the traditional TDD network use the same uplink/downlink configuration, so a base station or a UE is subjected to interference from an adjacent cell in an uplink sub-frame or a downlink sub-frame as illustrated in FIG. 2A or FIG. 2B:

First type of interference from the adjacent cell: downlink reception of a UE in the current cell is subjected to interference from a downlink signal of a base station in an adjacent cell in a sub-frame in which both of the two cells perform downlink transmission; and Second type of interference from the adjacent cell: reception of an uplink signal from a UE by a base station in the current cell is subjected to interference from an uplink signal of a UE in an adjacent cell in a sub-frame in which both of the two cells perform uplink transmission.

Also in the case that a plurality of cells are deployed in the network, if adjacent cells are configured with different proportions of uplink to downlink sub-frames, then interference across time slots as illustrated in FIG. 3 may arise. In FIG. 3, a macro cell transmits a downlink signal in a time slot in which a pico cell receives an uplink signal so that both of the two types of interference may arise between the two cells.

In the dynamic TDD system, there are sub-frames with a fixed transmission direction and sub-frames with a variable transmission direction. In each variable sub-frame, the transmission direction of an adjacent cell is flexibly variable, and the current cell may have more than one adjacent cell producing strong interference, so the types of interferences to the current cell may be different from each other. Extremely in each variable sub-frame, the interferences from the adjacent cells to downlink transmission in the current cell are different from each other. In different downlink sub-frames of the dynamic TDD system, different interferences from the adjacent cells may result in the significant difference in real channel conditions, and DL CSI measured in one downlink sub-frame may not be applicable to another downlink sub-frame in a different adjacent-cell interference condition. For example, CSI measured in a fixed downlink sub-frame is not applicable to a variable downlink sub-frame, and CSI measured in one variable downlink sub-frame is not applicable to another variable downlink sub-frame. In view of the reasons described above, the solution for configuring channel measurement and feedback currently adopted in the LTE Rel-8/9/10 is not applicable to the dynamic TDD system.

In summary, a method for configuring channel measurement and DL CSI feedback is absent in the dynamic TDD system.

SUMMARY OF THE INVENTION

Embodiments of the invention provide a method and device for configuring channel measurement so as to configure channel measurement in the dynamic TDD system.

Embodiments of the invention provide a method, system and device for DL CSI feedback so as to perform DL CSI feedback in the dynamic TDD system.

An embodiment of the invention provides a method for configuring channel measurement, the method including:

a network side device dividing downlink sub-frames into a plurality of groups of downlink sub-frames according to interference conditions in the downlink sub-frames; and the network side device notifying a user equipment of channel measurement configuration information corresponding to the groups of downlink sub-frames.

An embodiment of the invention provides a method for DL CSI feedback, the method including:

a user equipment receiving channel measurement configuration information, corresponding to groups of downlink sub-frames, from a network side device, wherein downlink sub-frames are divided by the network side device into the groups of downlink sub-frames according to interference conditions in the downlink sub-frames; and the user equipment measuring DL CSI according to the channel measurement configuration information and feeding back a measurement result to the network side device.

An embodiment of the invention provides a network side device for configuring channel measurement, the network side device including:

a dividing module configured to divide downlink sub-frames into a plurality of groups of downlink sub-frames according to interference conditions in the downlink sub-frames; and a first processing module configured to notify a user equipment of channel measurement configuration information corresponding to the groups of downlink sub-frames.

An embodiment of the invention provides a user equipment for DL CSI feedback, the user equipment including:

a receiving module configured to receive channel measurement configuration information, corresponding to groups of downlink sub-frames, from a network side device, wherein downlink sub-frames are divided by the network side device into the groups of downlink sub-frames according to interference conditions in the downlink sub-frames; and a second processing module configured to measure DL CSI according to the channel measurement configuration information and feeding back a measurement result to the network side device.

An embodiment of the invention provides a system for DL CSI feedback, the system including:

a network side device configured to divide downlink sub-frames into a plurality of groups of downlink sub-frames according to interference conditions in the downlink sub-frames and to notify a user equipment of channel measurement configuration information corresponding to the groups of downlink sub-frames; and the user equipment configured to receive the channel measurement configuration information, corresponding to the groups of downlink sub-frames, from the network side device, to measure DL CSI according to the channel measurement configuration information and to feed back a measurement result to the network side device.

The network side device notifies the user equipment of the channel measurement configuration information corresponding to the plurality of groups of downlink sub-frames resulting from division according to the interference conditions in the downlink sub-frames to thereby configure channel measurement in the dynamic TDD system.

The user equipment measures DL CSI according to the channel measurement configuration information and feeds back a measurement result to the network side device to thereby perform DL CSI feedback in the dynamic TDD system.

DETAILED DESCRIPTION OF THE EMBODIMENTS

Figure 1:
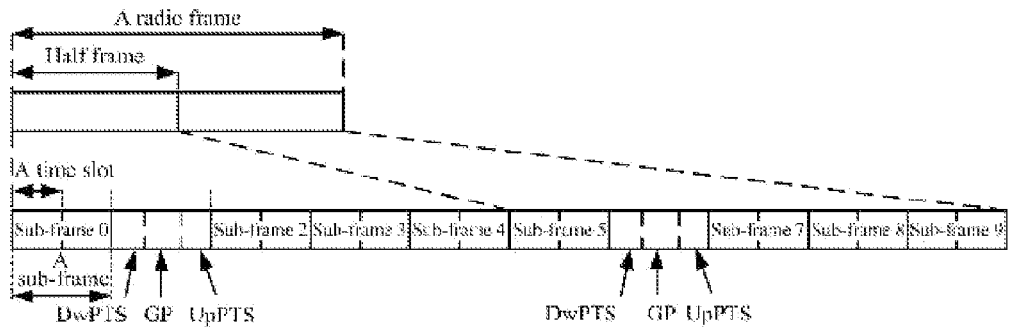
FIG. 1 is a schematic structural diagram of a TD-LTE system frame.
Figure 2A:
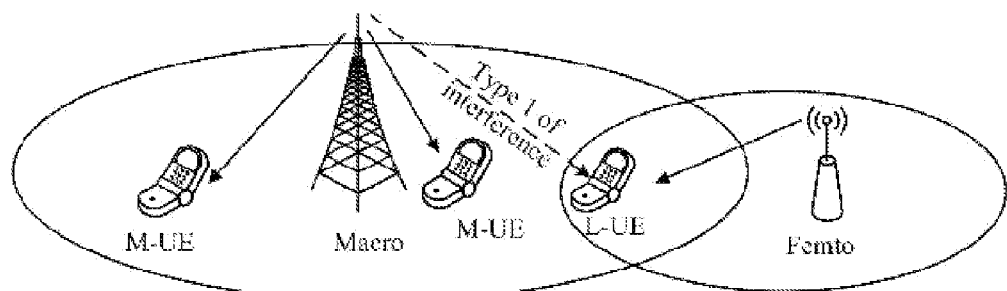
FIG. 2A is a schematic diagram of a first type of interference from an adjacent cell in the same TDD time slot configuration.
Figure 2B:
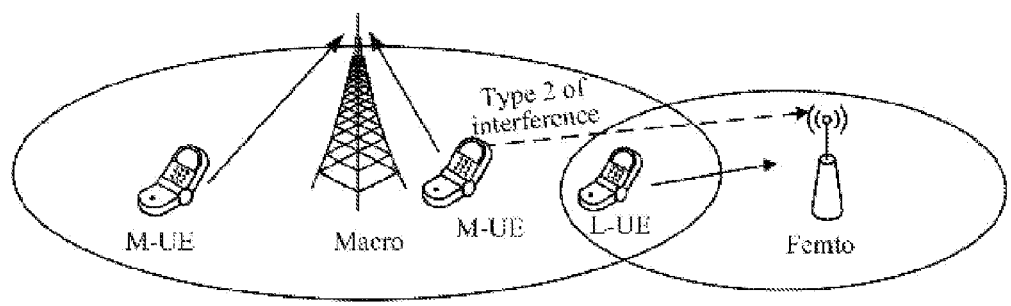
FIG. 2B is a schematic diagram of a second type of interference from an adjacent cell in the same TDD time slot configuration.
Figure 3:
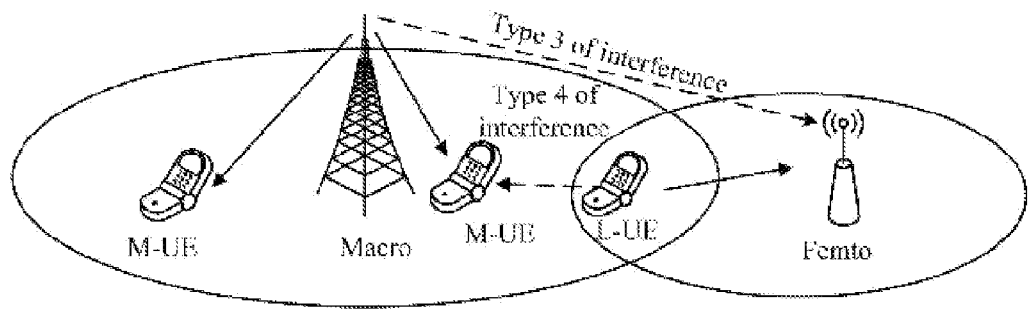
FIG. 3 is a schematic diagram of interference from an adjacent cell across TDD time slots.

In an embodiment of the invention, downlink sub-frames are divided into a plurality of groups of downlink sub-frames according to the interference conditions in the downlink sub-frames, and a user equipment is notified of channel measurement configuration information corresponding to the groups of downlink sub-frames. A network side device notifies the user equipment of the channel measurement configuration information corresponding to the plurality of groups of downlink sub-frames resulting from division according to the interference conditions in the downlink sub-frames to thereby configure channel measurement in the dynamic TDD system.

In an embodiment of the invention, a user equipment receives channel measurement configuration information, corresponding to groups of downlink sub-frames, from a network side device, measures DL CSI according to the channel measurement configuration information and feeds back a measurement result to the network side device. The user equipment measures the DL CSI according to the channel measurement configuration information and feeds back the measurement result to the network side device to thereby perform DL CSI feedback in the dynamic TDD system; and furthermore the network side device can accurately obtain the DL CSI of the downlink sub-frames in different interference conditions and schedule the downlink sub-frames in a similar interference condition according to the CSI to thereby address the issue of obtaining DL CSI in the case that the adjacent-cell interference condition of different sub-frames varies significantly in the dynamic TDD system and improve the system performance.

Particularly the DL CSI in the embodiments of the invention includes but will not be limited to one or more of the following information:

A Channel Quality Indicator (CQI), a Pre-coding Matrix Indicator (PMI), a Rank Indication (RI) and any other feedback information capable of reflecting the quality of the downlink channel.

Particularly a radio frame in the uplink configuration in the embodiments of the invention may include variable sub-frames, downlink fixed sub-frames, uplink fixed sub-frames and special sub-frames, where the downlink fixed sub-frames are sub-frames, of which the transmission directions are the downlink directions and unchanged, and downlink pilot time slots in the special sub-frames; the uplink fixed sub-frames are sub-frames of which the transmission directions are the uplink direction and unchanged; and the variable sub-frames are sub-frames variable in transmission direction, and further include uplink variable sub-frames which are variable sub-frames determined for uplink transmission, and downlink variable sub-frames which are variable sub-frames determined for downlink transmission.

Uplink pilot time slots in the special sub-frames in the embodiments of the invention are functionally identical to the uplink pilot time slots in the special sub-frames in the prior art, so a repeated description thereof will be omitted here.

The embodiments of the invention can be applicable to TDD systems (e.g., a TD LTE system) or can be applicable to other systems for which the uplink/downlink configuration of sub-frames needs to be adjusted dynamically, e.g., a TD-SCDMA system and an evolved system subsequent thereto, a Worldwide Interoperability for Microwave Access (WiMAX) system and an evolved system subsequent thereto, etc.

In order to support the use of a larger number of downlink sub-frames, only one fixed uplink sub-frame can be set in a radio frame, that is, the sub-frame 2 is set as an uplink fixed sub-frame, the sub-frame 0 and the sub-frame 5 are set as downlink fixed sub-frames, the sub-frame 1 is set as a special sub-frame, the sub-frame 6 is set as a special sub-frame or a downlink sub-frame (a sub-frame of which the transmission direction is the downlink), and the remaining sub-frames are variable sub-frames.

Figure 4A:
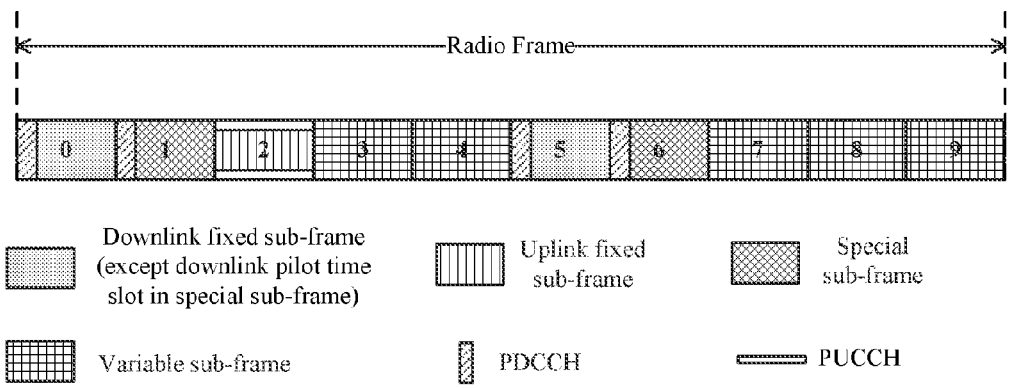
FIG. 4A is a schematic structural diagram of a first sub-frame according to an embodiment of the invention.

Particularly when the sub-frame 7 is an uplink sub-frame (that is, the sub-frame 7 is a variable sub-frame of which the transmission direction is the uplink, i.e., an uplink variable sub-frame), the sub-frame 6 is a special sub-frame, e.g., a radio frame structure as illustrated in FIG. 4A.

Figure 4B:
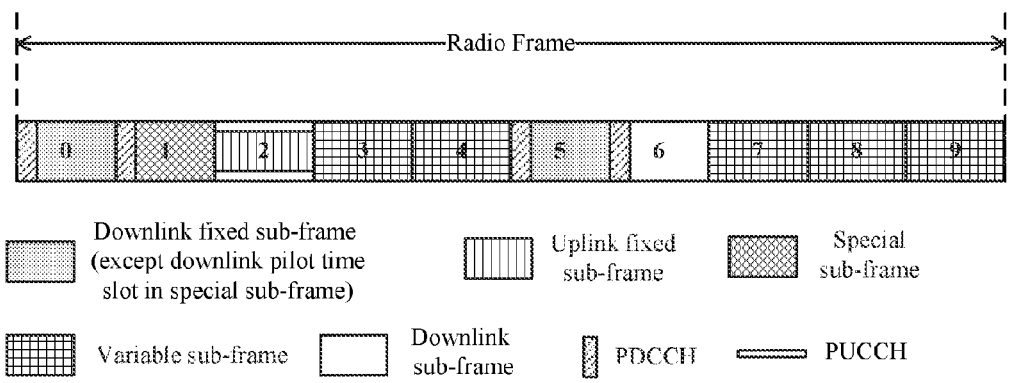
FIG. 4B is a schematic structural diagram of a second sub-frame according to an embodiment of the invention.

When the sub-frame 7 is a downlink sub-frame (that is, the sub-frame 7 is a variable sub-frame of which the transmission direction is the downlink, i.e., a downlink variable sub-frame), the sub-frame 6 is a downlink sub-frame (i.e., a sub-frame of which the transmission direction is the downlink), e.g., a radio frame structure as illustrated in FIG. 4B; and the highest proportion of downlink (DL) sub-frames to uplink (UL) sub-frames which can be supported in this frame structure is 9:1 to thereby make the adaptive dynamic range of resources in the dynamic TDD system larger and better match with a variation in traffic.

Particularly in the embodiments of the invention, the network side device can divide the downlink sub-frames into the plurality of groups of downlink sub-frames according to the interference conditions in the downlink sub-frames as follows: dividing sub-frames in a radio frame into a plurality of groups of downlink sub-frames according to the transmission directions of the sub-frames required to be scheduled and sub-frame configuration information of the cell which is adjacent to a target cell and produces strong interference.

Preferably the network side device can judge whether a cell adjacent to the target cell is a cell producing strong interference in one of the following manners:

(1) The network side device judges whether a cell adjacent to the target cell is a cell producing strong interference according to the detected signal strength of the cell adjacent to the target cell, for example, by comparing the signal strength with a threshold, and if the signal strength is above the threshold, then the cell is considered as a cell producing strong interference:

(2) The network side device judges whether a cell adjacent to the target cell is a cell producing strong interference according to a cell identifier corresponding to the cell producing strong interference reported by the user equipment belonging to the target cell, for example, the user equipment can detect the signal strength of the cell adjacent to the target cell, and if the signal strength is above the threshold, then the user equipment reports the cell identifier of the cell, and correspondingly the network side device considers the corresponding cell as a cell producing strong interference upon reception of the cell identifier; and (3) The network side device receives notification information transmitted by a cell adjacent to the target cell and then determines that the cell is a cell producing strong interference adjacent to the target cell, where the notification information is transmitted by the cell adjacent to the target cell after the cell determines that it is a cell producing strong interference on the target cell according to the received signal strength transmitted by the target cell, for example, the adjacent cell can measure a signal of the cell suffering from interference, and if there is a low path loss, then the adjacent cell considers itself as a cell producing strong interference on this cell and then notify the cell in signaling via a network interface.

It shall be noted that the embodiments of the invention will not be limited to the three manners described above but other manners in which it can be judged whether a cell adjacent to the target cell is a cell producing strong interference will be equally applicable to the embodiments of the invention.

Preferably the network side device can obtain the sub-frame configuration information of the cell producing strong interference adjacent to the target cell through interface signaling notification or can detect actively and thus obtain the sub-frame configuration information of the cell producing strong interference adjacent to the target cell. Of course other manners in which the sub-frame configuration information can be obtained will be also applicable to the embodiments of the invention, for example, the user equipment can obtain and then notify the network side device of the sub-frame configuration information.

In an implementation, the network side device can divide the fixed sub-frames, of which the transmission directions are the downlink or which include downlink pilot time slots, in the cell into a group of downlink sub-frames, and divide the variable sub-frames, of which the transmission directions are the downlink, in the target cell into at least one group of downlink sub-frames.

In the TDD sub-frame configuration with seven kinds of sub-frames, for example, all of downlink sub-frames in a radio frame are divided into two categories, where one category includes sub-frames of which the configuration directions are unchanged in the adjacent cell, and the other category includes sub-frames of which the configuration directions are possibly changed in the adjacent cell (here a sub-frame index is a sub-frame index in a radio frame, i.e., $N=\{0, 1, 2, \ldots, 9\}$).

The sub-frames of which the configuration directions are unchanged in the adjacent cell are for example the sub-frames 0, 1, 2, 5 and 6 in each radio frame, where the sub-frames 0, 1, 5 and 6 are always downlink sub-frames (or sub-frames including downlink pilot time slots), and the sub-frame 2 is always an uplink sub-frame. The four downlink sub-frames. i.e., the sub-frames 0, 1, 5 and 6, suffer from adjacent-cell interferences which are all the downlink interference from a base station, so the interferences from the base station on these several sub-frames can be considered substantially the same, and thus the downlink sub-frames 0, 1, 5 and 6 form a group of downlink sub-frames, and then variable sub-frames, of which the transmission direction are the downlink, in the target cell are divided into at least one group of downlink sub-frames, for example, the sub-frames 3, 4, 7, 8 and 9 in each radio frame are variable sub-frames, so the sub-frames 3, 4, 7, 8 and 9 are divided into such a number of groups of downlink sub-frames that is not larger than the number of downlink sub-frames among the sub-frames 3, 4, 7, 8 and 9.

Preferably the network side device can further divide the variable sub-frames into two categories of variable sub-frames, where a first category of variable sub-frames include variable sub-frames of which the transmission directions are the downlink in all the cells producing strong interference, and the second category of variable sub-frames include variable sub-frames of which the transmission directions are the downlink in a part of the cells producing strong interference.

Then the network side device divides the first category of variable sub-frames into a group of downlink sub-frames and divides the second category of variable sub-frames into at least one group of downlink sub-frames, where the second category of variable sub-frames in each of the groups of downlink sub-frames resulting from division have the same transmission direction in each of the cells producing strong interference.

Particularly, if the directions of all the adjacent cells in the current sub-frame are the same as the target cell, i.e., the downlink, then the sub-frame can be allocated to the same group of downlink sub-frames as the sub-frames 0, 1, 5 and 6, e.g., they form a group of downlink sub-frames.

If one or more adjacent cells have a different direction in the current sub-frame from that of the target cell, then a plurality of combinations of interference directions can be derived, and sub-frames with the same combination of interference directions are put into the same group of downlink sub-frames to thereby obtain at least one set.

It is assumed that the target cell is in the sub-frame configuration 5; and there are two adjacent cells producing strong interference, of which time slot configurations are configuration 1 and configuration 2 respectively, as depicted in Table 1:

TABLE 1

| | Sub-frame index | | | | | | | | | |
|---|---|---|---|---|---|---|---|---|---|---|
| | 0 | 1 | 2 | 3 | 4 | 5 | 6 | 7 | 8 | 9 |
| Target cell | D | S | U | D | D | D | D | D | D | D |
| Cell 1 producing interference | D | S | U | U | D | D | S | U | U | D |
| Cell 2 producing interference | D | S | U | D | D | D | S | U | D | D |

The sub-frames 0, 1, 5 and 6 are fixed sub-frames, of which the transmission directions are the downlink or which include downlink pilot time slots, in the target cell.

The sub-frames 3, 4, 7, 8 and 9 are variable sub-frames, of which the transmission directions are the downlink, in the target cell, and the sub-frame 9 has the downlink transmission direction in both the cell 1 and the cell 2, so the sub-frame 9 belongs to the first category of variable sub-frames and is put into a group of downlink sub-frames including the sub-frames 0, 1, 5, 6 and 9.

Combinations of transmission directions corresponding to the sub-frames 3, 4, 7 and 8 in the cell 1 and the cell 2 are (U, D), (D, D), (U, U) and (U, D) respectively.

Since the combination of transmission directions of the sub-frame 3 and the sub-frame 8 is (U, D) in both the cell 1 and the cell 2, so the sub-frame 3 and the sub-frame 8 are divided into a group of downlink sub-frames, the sub-frame 4 is divided into a set, and the sub-frame 7 is divided into a group of downlink sub-frames.

Alternatively to the manner described above, in an embodiment of the invention, each of the downlink sub-frames can be taken as a group of downlink sub-frames respectively, or fixed sub-frames can be divided into a group and variable sub-frames can be divided into a group.

It shall be noted that the embodiments of the invention will not be limited to the division manners described above but any other manners in which the downlink sub-frames can be divided into the groups of downlink sub-frames according to the interference conditions in the downlink sub-frames are all applicable to the embodiments of the invention.

The embodiments of the invention will be described below in further details with reference to the drawings.

In the following description, firstly an implementation with cooperation of the network side and the user equipment side will be described, and finally implementations at the network side and the user equipment side will be described respectively, but this will not suggest that the two sides must cooperate with each other. In fact, problems present respectively at the network side and the user equipment side will also be addressed in the separate implementations at the network side and the user equipment side, although a better technical effect can be achieved when the two sides cooperate with each other.

Figure 5:
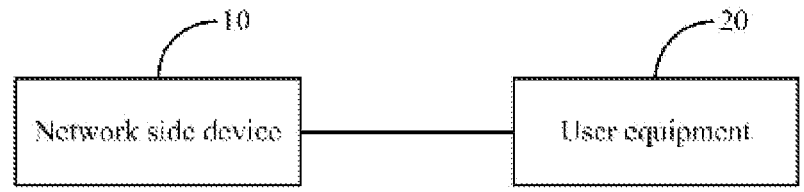
FIG. 5 is a schematic structural diagram of a system for DL CSI feedback according to an embodiment of the invention.

As illustrated in FIG. 5, a system for DL CSI feedback according to an embodiment of the invention includes a network side device 10 and a user equipment 20.

The network side device 10 is configured to divide downlink sub-frames into a plurality of groups of downlink sub-frames according to interference conditions in the downlink sub-frames and to notify the user equipment 20 of channel measurement configuration information corresponding to the groups of downlink sub-frames; and The user equipment 20 is configured to receive the channel measurement configuration information, corresponding to the groups of downlink sub-frames, from the network side device, to measure DL CSI according to the channel measurement configuration information and to feed back a measurement result to the network side device.

In an implementation, all the channel measurement configuration information of the groups of downlink sub-frames resulting from division by the network side device 10 may not be notified to the same user equipment 20 but the network side device 10 can select one of the groups of downlink sub-frames of which the channel measurement configuration information is notified to the user equipment 20. For example, there are groups of downlink sub-frames 1, 2, 3, 4 and 5, and then channel measurement configuration information of the groups of downlink sub-frames 1 and 2 can be notified to a user equipment a, channel measurement configuration information of the group of downlink sub-frames 3 can be notified to a user equipment b, and channel measurement configuration information of the groups of downlink sub-frames 4 and 5 can be notified to a user equipment c. The user equipment only needs to make measurement and feedback according to the channel measurement configuration information without any knowledge of the number of groups.

Particularly two schemes for DL CSI feedback are provided in the embodiments of the invention, i.e., periodically and non-periodically, as described respectively below.

I. DL CSI is Fed Back Periodically.

Particularly the network side device 10 notifies the user equipment 20 of the downlink sub-frames included in the groups of downlink sub-frames; and correspondingly the user equipment 20 receives the notification of the downlink sub-frames included in the groups of downlink sub-frames from the network side device.

For example, the network side device 10 notifies the user equipment 20 of the downlink sub-frames included in each of the groups through higher-layer signaling.

Preferably the network side device 10 takes a feedback periodicity of periodical CSI, a feedback sub-frame and a feedback channel resource as the channel measurement configuration information corresponding to the group of downlink sub-frames, and notifies the user equipment 20 of the channel measurement configuration information through signaling.

Particularly the network side device 10 determines the feedback periodicity of periodical CSI, the feedback sub-frame and the feedback channel resource corresponding to the group of downlink sub-frames and takes the determined feedback periodicity of periodical CSI, feedback sub-frame and feedback channel resource corresponding to the group of downlink sub-frames as the channel measurement configuration information corresponding to the group of downlink sub-frames; and correspondingly the user equipment 20 feeds back the DL CSI, measured in the corresponding group of downlink sub-frames, in the feedback sub-frame over the feedback channel resource at the feedback periodicity of periodical CSI.

Particularly the feedback channel resource can be a PUCCH channel number, e.g., a PUCCH format 2 or PUCCH format 3 channel number, or can be a PUSCH resource.

There are a number of particular feedback schemes, several of which will be exemplified below.

In a first feedback scheme, the network side device 10 allocates feedback channel resources (for example, a part of them are the same, all of them are the same or none of them is the same as any other), the same CSI feedback periodicity and different feedback sub-frames (for example, a part of them are the same or none of them is the same as any other) to at least two groups of downlink sub-frames.

The user equipment 20 feeds back the DL CSI, measured in corresponding one of the groups of sub-frames, at a corresponding sub-frame location at a time.

For example, the user equipment 20 feeds back, in the sub-frame n, the DL CSI of the group of downlink sub-frames corresponding to the feedback sub-frame measured in the sub-frame n−$k_i$, where $k_i \geq m$, m is a processing time period of the user equipment by taking a sub-frame as unit, the sub-frame n−$k_i$ is a downlink sub-frame in the group of downlink sub-frames closest to the sub-frame n, i is a positive integer smaller than or equal to N, and N is the number of the groups of downlink sub-frames.

For example the processing time period of the user equipment includes time periods of receiving and processing control signaling, making CSI measurement, preparing for uplink transmission, etc., by the user equipment (the same will apply to the following processing time period of the user equipment, so a repeated description thereof ill be omitted). For example, a typical processing time period of the user equipment is the length of 4 sub-frames, i.e., 4 ms.

For example, there are two groups 1 and 2 of downlink sub-frames. The user equipment 20 feeds back, in the sub-frame n, DL CSI measured in the sub-frame n−k1, where k1≥4 and the sub-frame n−k1 is a downlink sub-frame which is closest to the sub-frame n and belongs to the group 1 of sub-frames; and the user equipment 20 feeds back, in the sub-frame m, DL CSI measured in the sub-frame m−k2, where k2≥4 and the sub-frame m−k2 is a downlink sub-frame which is closest to the sub-frame m and belongs to the group 2 of sub-frames.

In a second feedback scheme, the network side device 10 allocates feedback channel resources (for example, a part of them are the same, all of them are the same or none of them is the same as any other), different CSI feedback periodicities (for example, a part of them are the same or none of them is the same as any other) and different feedback sub-frames (for example, a part of them are the same or none of them is the same as any other) to at least two groups of downlink sub-frames.

The user equipment 20 feeds back the DL CSI, measured in corresponding one of the groups of sub-frames, at a corresponding sub-frame location at a time.

For example, the user equipment 20 feeds back, in the sub-frame n, the DL CSI of the group of downlink sub-frames corresponding to the feedback sub-frame measured in the sub-frame n−$k_i$, where $k_i \geq m$, m is a processing time period of the user equipment by taking a sub-frame as unit, the sub-frame n−$k_i$ is a downlink sub-frame in the group of downlink sub-frames closest to the sub-frame n, i is a positive integer smaller than or equal to N, and N is the number of the groups of downlink sub-frames.

For example, there are two groups 1 and 2 of downlink sub-frames. The user equipment 20 feeds back, in the sub-frame n, DL CSI measured in the sub-frame n−k1, where k1≥4 and the sub-frame n−k1 is a downlink sub-frame which is closest to the sub-frame n and belongs to the group 1 of sub-frames; and the user equipment 20 feeds back, in the sub-frame m, DL CSI measured in the sub-frame m−k2, where k2≥4 and the sub-frame m−k2 is a downlink sub-frame which is closest to the sub-frame m and belongs to the group 2 of sub-frames.

Particularly when m=n, the user equipment 20 discards DL CSI of one group of sub-frames but feeds back DL CSI of only the other one group of sub-frames. That is, if a feedback sub-frame corresponds to a plurality of groups of downlink sub-frames, then the user equipment 20 feeds back, in the feedback sub-frame, the DL CSI measured in one of the plurality of groups of downlink sub-frames.

In a third feedback scheme, the network side device 10 allocates the same CSI feedback periodicity, the same feedback sub-frame and the same feedback channel resource to at least two groups of downlink sub-frames.

The user equipment 20 feeds back the DL CSI, measured in corresponding one of the groups of sub-frames, at a corresponding sub-frame location at a time.

For example, the user equipment 20 feeds back, in the sub-frame n, the DL CSI of the group of downlink sub-frames corresponding to the feedback sub-frame measured in the sub-frame n−$k_i$, where $k_i \geq m$, m is a processing time period of the user equipment by taking a sub-frame as unit, the sub-frame n−$k_i$ is a downlink sub-frame in the group of downlink sub-frames closest to the sub-frame n, i is a positive integer smaller than or equal to N, and N is the number of the groups of downlink sub-frames.

For example, two groups 1 and 2 of downlink sub-frames are configured with the same CSI feedback periodicity, the same feedback sub-frame and the same feedback channel resource. The user equipment 20 feeds back, in the sub-frame n, DL CSI measured in the sub-frame n−k1 and DL CSI measured in the sub-frame n−k2, where k1≥4, k2≥4, the sub-frame n−k1 is a downlink sub-frame which is closest to the sub-frame n and belongs to the group 1 of sub-frames, and the sub-frame n−k2 is a downlink sub-frame which is closest to the sub-frame n and belongs to the group 2 of sub-frames. That is, if a feedback sub-frame corresponds to a plurality of groups of downlink sub-frames, then the user equipment 20 feeds back, in the feedback sub-frame, the DL CSI measured in each corresponding group of downlink sub-frames.

In a fourth feedback scheme which is the combination of the third feedback scheme with the first feedback scheme or the second feedback scheme, when there are more than two groups of downlink sub-frames, the network side device 10 further divides the groups of downlink sub-frames into a plurality of sets of sub-frames, where each set of sub-frames includes one or more groups of downlink sub-frames. The third feedback scheme is used in each set of sub-frames, and the first feedback scheme or the second feedback scheme is used between the sets of sub-frames.

Preferably the PUCCH format 2 can be used for the first feedback scheme and the second feedback scheme, and the PUCCH format 3 or a PUSCH can be used for the third feedback scheme.

II. DL CSI is Fed Back Non-Periodically.

Particularly the network side device 10 configures each of the groups of downlink sub-frames with a DL CSI measurement sub-frame and notifies the user equipment 20 through signaling; and the user equipment 20 measures DL CSI in the corresponding downlink sub-frame.

There are two particular schemes for configuring the DL CSI measurement sub-frame as described respectively below.

In a first configuration scheme, the network side device 10 takes downlink sub-frames included in each group of downlink sub-frames and a CSI measurement periodicity corresponding to the each group of downlink sub-frames as the channel measurement configuration information corresponding to the group of downlink sub-frames.

Correspondingly the user equipment 20 selects a downlink sub-frame from a group of downlink sub-frames as a DL CSI measurement sub-frame and measures DL CSI at the corresponding CSI measurement periodicity.

Particularly the network side device 10 notifies the user equipment 20 of the condition of grouping sub-frames through signaling, for example, notifies the user equipment 20 of downlink sub-frames included in each group through higher-layer signaling, and the network side device 10 sets a downlink CSI measurement periodicity for each group of sub-frames and notifies the user equipment through signaling; and the user equipment 20 selects a downlink sub-frame in each group of downlink sub-frames per the periodicity to measure DL CSI and stores the measurement result.

In a second configuration scheme, the network side device 10 takes a correspondence relationship between each CSI measurement sub-frame and a group of downlink sub-frames, and a CSI measurement periodicity corresponding to the group of downlink sub-frames as the channel measurement configuration information corresponding to the group of downlink sub-frames, where one CSI measurement sub-frame corresponds to one group of downlink sub-frames.

Since the CSI measurement sub-frame is repeated periodically, the event that one CSI measurement sub-frame corresponds to one group of downlink sub-frames here refers to that the same sub-frame index corresponds to one group of downlink sub-frames. For example, with the periodicity of 10 ms, a downlink sub-frame a corresponds to a group of downlink sub-frames a in the current periodicity, and the downlink sub-frame a still corresponds to the group of downlink sub-frames a in the next periodicity.

Correspondingly the user equipment 20 measures DL CSI in the DL CSI measurement sub-frame corresponding to the group of downlink sub-frames at the corresponding CSI measurement periodicity.

Particularly the network side device 10 directly notifies the user equipment 20 of more than one CSI measurement sub-frame through signaling, where each of the CSI measurement sub-frames corresponds to a group of downlink sub-frames. For example, the network side device notifies the user equipment of a CSI measurement sub-frame periodicity and channel measurement configuration information corresponding to each of the groups of downlink sub-frames through higher-layer signaling. The CSI measurement sub-frame periodicities and sub-frame indexes corresponding to different groups of downlink sub-frames are configured in separate signaling; and the user equipment 20 measures DL CSI periodically in the CSI measurement sub-frame corresponding to each of the groups of downlink sub-frames and stores the measurement result.

Due to the non-periodical feedback, the network side device 10 further needs to trigger the user equipment 20 to feed back the DL CSI of at least one of the groups of downlink sub-frames after configuring the groups of downlink sub-frames with the DL CSI measurement sub-frames; and correspondingly the user equipment 20 feeds back the measurement result after triggered by the network side device.

Preferably the network side device 10 can trigger the user equipment 20 to feed back the DL CSI of at least one of the groups of downlink sub-frames over a corresponding PUSCH resource through CQI request information in a UL grant; and correspondingly the user equipment 20 feeds back the measurement result upon determining that the feedback is required according to the CQI request information in the received UL grant of the network side device.

There are a number of trigger schemes by the CQI request information in the UL grant, several of which will be exemplified below.

In a first trigger scheme, 1 bit is occupied by the CQI request information, and the bit indicates whether to trigger the feedback.

Preferably if the UL grant carrying the CQI request information schedules PUSCH transmission of the sub-frame n (that is, the UL grant schedules transmission of a PUSCH in the sub-frame n), and the CQI request information indicates that CSI needs to be fed back, then the user equipment 20 feeds back, the DL CSI measured in the sub-frame n−k, in the sub-frame n over the PUSCH, where k≥m, m is a processing time period of the user equipment by taking a sub-frame as unit, and the sub-frame n−k is a DL CSI measurement sub-frame closest to the sub-frame n.

For example, when the bit is 1, a DL CSI feedback is triggered, and when the bit is 0, no DL CSI feedback is triggered. When the UL grant carrying the CQI request information is transmitted in the sub-frame n of the PUSCH, the user equipment 20 feeds back, the DL CSI measured in the sub-frame n−k, in the sub-frame n over the PUSCH, where k≥4 and the sub-frame n−k is the DL CSI measurement sub-frame closest to the sub-frame n. DL CSI of only one group of downlink sub-frames is fed back over the PUSCH at a time.

In a second trigger scheme, 1 bit is occupied by the CQI request information, and the bit indicates whether to trigger the feedback.

Preferably if the UL grant carrying the CQI request information schedules PUSCH transmission of the sub-frame n, and the CQI request information indicates that CSI needs to be fed back, then the user equipment 20 feeds back, the DL CSI measured in the sub-frame n−$k_i$, in the sub-frame n over the PUSCH, where $k_i \geq m$, m is a processing time period of the user equipment by taking a sub-frame as unit, the sub-frame n−$k_i$ is a DL CSI measurement sub-frame in the i-th group of downlink sub-frames closest to the sub-frame n, i is a positive integer smaller than or equal to N, and N is the number of the groups of downlink sub-frames.

For example, there are two groups 1 and 2 of downlink sub-frames, and when the bit is 1, a DL CSI feedback is triggered, and when the bit is 0, no DL CSI feedback is triggered. When the UL grant carrying the CQI request information is transmitted in the sub-frame n of the PUSCH, the user equipment 20 feeds back, the DL CSI measured in the sub-frame n−k1 and the DL CSI measured in the sub-frame n−k2, in the sub-frame n over the PUSCH, where k1≥4 and k2≥4, the sub-frame n−k1 is a DL CSI measurement sub-frame which is closest to the sub-frame n and in the group 1 of downlink sub-frames, and the sub-frame n−k2 is a DL CSI measurement sub-frame which is closest to the sub-frame n and in the group 2 of downlink sub-frames. DL CSI of a plurality of groups of downlink sub-frames is fed back over the PUSCH at a time.

In a third trigger scheme, a plurality of bits are occupied by the CQI request information, and a plurality of bit combinations of the CQI request information indicate one of the groups of downlink sub-frames for which the DL CSI is fed back by the user equipment.

Particularly the network side device 10 determines a bit value corresponding to a group of downlink sub-frames, for which a feedback is required, according to a correspondence relationship between the group of downlink sub-frames and the bit value, determines the CQI request information according to the determined bit value and notifies the user equipment 20 of the determined CQI request information.

Correspondingly the user equipment 20 determines the group of downlink sub-frames corresponding to the bit value of the CQI request information according to the correspondence relationship between the group of downlink sub-frames and the bit value and feeds back the DL CSI measured in the DL CSI measurement sub-frame in the determined group of downlink sub-frames.

Preferably if the UL grant carrying the CQI request information schedules PUSCH transmission of the sub-frame n, and the CQI request information indicates that CSI needs to be fed back, then the user equipment 20 feeds back, the DL CSI measured in the sub-frame n−$k_i$, in the sub-frame n over the PUSCH, where $k_i \geq m$, m is a processing time period of the user equipment by taking a sub-frame as unit, the sub-frame n−$k_i$ is a DL CSI measurement sub-frame in the i-th group of downlink sub-frames closest to the sub-frame n, i is a positive integer smaller than or equal to N, i is an index of a group of downlink sub-frames for which a feedback triggered by the CQI request information is required, and N is the number of the groups of downlink sub-frames.

Taking 2 bits as an example, as depicted in Table 2, when the UL grant carrying the CQI request information is transmitted in the sub-frame n of the PUSCH, the user equipment 20 feeds back, the DL CSI measured in the sub-frame n−k1 and/or the DL CSI measured in the sub-frame n−k2, in the sub-frame n over the PUSCH, where k1≥4 and k2≥4, the sub-frame n−k1 is a DL CSI measurement sub-frame which is closest to the sub-frame n and in the group 1 of downlink sub-frames, and the sub-frame n−k2 is a DL CSI measurement sub-frame which is closest to the sub-frame n and in the group 2 of downlink sub-frames. DL CSI of one or more groups of downlink sub-frames is fed back over the PUSCH at a time.

TABLE 2

| Bit value of CQI request information | Description |
| --- | --- |
| 00 | No DL CSI feedback is triggered |
| 01 | DL CSI feedback of the group 1 of downlink sub-frames is triggered |
| 10 | DL CSI feedback of the group 2 of downlink sub-frames is triggered |
| 11 | DL CSI feedbacks of the groups 1 and 2 of downlink sub-frames are triggered |

In a fourth trigger scheme, a plurality of bits are occupied by the CQI request information. When there are a number of groups of downlink sub-frames, the groups of downlink sub-frames are further divided into sets, each of which includes more than one group of downlink sub-frames. A plurality of bit combinations of the CQI request information indicate one of the sets with the group of downlink sub-frames for which the DL CSI is fed back by the user equipment.

Particularly the network side device 10 determines a bit value corresponding to a set of downlink sub-frames, for which a feedback is required, according to a correspondence relationship between the set of downlink sub-frames and the bit value, determines the CQI request information according to the determined bit value and notifies the user equipment 20 of the determined CQI request information, where one set of downlink sub-frames includes at least one group of downlink sub-frames.

Correspondingly the user equipment 20 determines the set of downlink sub-frames corresponding to the bit value of the CQI request information according to the correspondence relationship between the set of downlink sub-frames and the bit value and feeds back the DL CSI measured in the DL CSI measurement sub-frame in the group of downlink sub-frames in the determined set of downlink sub-frames, where one set of downlink sub-frames includes at least one group of downlink sub-frames.

Preferably if the UL grant carrying the CQI request information schedules PUSCH transmission of the sub-frame n, and the CQI request information indicates that CSI needs to be fed back, then the user equipment 20 feeds back, the DL CSI measured in the sub-frame n−$k_i$, in the sub-frame n over the PUSCH, where $k_i \geq$ the processing time period of the user equipment, the sub-frame n−$k_i$ is a DL CSI measurement sub-frame in the i-th group of downlink sub-frames closest to the sub-frame n, i is a positive integer smaller than or equal to N, i is an index of a group of downlink sub-frames for which a feedback triggered by the CQI request information is required, and N is the number of the groups of downlink sub-frames.

In an example where the CQI request information occupies 2 bits and there are four divided groups of downlink sub-frames, the groups 1 and 2 of downlink sub-frames form a set 1 of downlink sub-frames, and the groups 3 and 4 of downlink sub-frames form a set 2 of downlink sub-frames, as depicted in the table below. When the UL grant carrying the CQI request information is transmitted in the sub-frame n of a PUSCH, the UE feeds back, the DL CSI measured in the sub-frame n−$k_i$, in the sub-frame n over the PUSCH, where $k_i$≥m, the sub-frame n−$k_i$ is a DL CSI measurement sub-frame which is closest to the sub-frame n and in the i-th group of downlink sub-frames, i is the index of a group of sub-frames, and the group i of sub-frames is a group of sub-frames in a set of downlink sub-frames triggered by the CQI request information. The DL CSI of a set of sub-frames, including DL CSI of more than one group of sub-frames, is fed back over the PUSCH at a time

TABLE 3

| Bit value of CQI request information | Description |
| --- | --- |
| 00 | No DL CSI feedback is triggered |
| 01 | DL CSI feedback of the set 1 of downlink sub-frames is triggered |
| 10 | DL CSI feedback of the set 2 of downlink sub-frames is triggered |
| 11 | DL CSI feedbacks of the sets 1 and 2 of downlink sub-frames are triggered |

Based on the methods described above, the network side device 10 obtains the downlink CSI information corresponding to the groups of downlink sub-frames through receiving the feedback information of the user equipment 20.

Particularly the network side device according to the embodiments of the invention can be a base station (e.g., a macro base station, a home base station, etc.) or can be a Relay Node (RN) device or can be another network side device.

Figure 6:
FIG. 6 is a schematic structural diagram of a network side device in the system for DL CSI feedback according to an embodiment of the invention.

As illustrated in FIG. 6, a network side device in a system for DL CSI feeding back according to an embodiment of the invention includes a dividing module 600 and a first processing module 610.

The dividing module 600 is configured to divide downlink sub-frames into a plurality of groups of downlink sub-frames according to interference conditions in the downlink sub-frames; and The first processing module 610 is configured to notify a user equipment of channel measurement configuration information corresponding to the groups of downlink sub-frames.

Preferably the first processing module 610 notifies the user equipment of the downlink sub-frames included in the groups of downlink sub-frames.

Preferably the first processing module 610 determines a feedback periodicity of periodical CSI, a feedback sub-frame and a feedback channel resource corresponding to each of the groups of downlink sub-frames and takes the determined feedback periodicity of periodical CSI, feedback sub-frame and feedback channel resource corresponding to the group of downlink sub-frames as the channel measurement configuration information corresponding to the group of downlink sub-frames.

Preferably the first processing module 610 allocates feedback channel resources, the same CSI feedback periodicity and different feedback sub-frames to at least two groups of downlink sub-frames.

Preferably the first processing module 610 allocates the same CSI feedback periodicity, the same feedback sub-frame and the same feedback channel resource to at least two groups of downlink sub-frames.

Preferably the first processing module 610 takes downlink sub-frames included in each of the groups of downlink sub-frames and a CSI measurement periodicity corresponding to the group of downlink sub-frame as channel measurement configuration information corresponding to the group of downlink sub-frame; or takes a correspondence relationship between each CSI measurement sub-frame and a group of downlink sub-frames, and a CSI measurement periodicity corresponding to the group of downlink sub-frames as channel measurement configuration information corresponding to the group of downlink sub-frames, where one CSI measurement sub-frame corresponds to one group of downlink sub-frames.

Preferably the first processing module 610 triggers the user equipment to feed back the DL CSI of at least one group of downlink sub-frames.

Preferably the first processing module 610 triggers the user equipment to feed back the DL CSI of at least one group of downlink sub-frames through CQI request information in a UL grant.

When 1 bit is occupied by the CQI request information, the bit indicates whether to trigger a feedback.

A plurality of bits are occupied by the CQI request information; and preferably the first processing module 610 determines a bit value corresponding to a group of downlink sub-frames, for which a feedback is required, according to a correspondence relationship between the group of downlink sub-frames and the bit value, determines the CQI request information according to the determined bit value and notifies the user equipment of the determined CQI request information; or determines a bit value corresponding to a set of downlink sub-frames, for which a feedback is required, according to a correspondence relationship between the set of downlink sub-frames and the bit value, determines the CQI request information according to the determined bit value and notifies the user equipment of the determined CQI request information, where one set of downlink sub-frames includes at least one group of downlink sub-frames.

Figure 7:
FIG. 7 is a schematic structural diagram of a user equipment in the system for DL CSI feedback according to an embodiment of the invention.

As illustrated in FIG. 7, a user equipment in a system for DL CSI feeding back according to an embodiment of the invention includes a receiving module 700 and a second processing module 710.

The receiving module 700 is configured to receive channel measurement configuration information, corresponding to groups of downlink sub-frames, from a network side device, where downlink sub-frames are divided by the network side device into the groups of downlink sub-frames according to interference conditions in the downlink sub-frames; and The second processing module 710 is configured to measure DL CSI according to the channel measurement configuration information and feeding back a measurement result to the network side device.

Preferably the receiving module 700 receives a notification of the downlink sub-frames included in the groups of downlink sub-frames from the network side device.

Preferably the channel measurement configuration information comprises a feedback periodicity of periodical CSI, a feedback sub-frame and a feedback channel resource corresponding to each of the groups of downlink sub-frames.

Preferably the second processing module 710 feeds back the DL CSI, measured in the corresponding group of downlink sub-frames, in the feedback sub-frame over the feedback channel resource at the feedback periodicity of periodical CSI.

Preferably the second processing module 710 feeds back, in the sub-frame n, the DL CSI of the group of downlink sub-frames corresponding to the feedback sub-frame measured in the sub-frame n−$k_i$; where $k_i \geq m$, m is a processing time period of the user equipment by taking a sub-frame as unit, the sub-frame n−$k_i$ is a downlink sub-frame in the group of downlink sub-frames closest to the sub-frame n, i is a positive integer smaller than or equal to N, and N is the number of the groups of downlink sub-frames.

Preferably the same CSI feedback periodicity and different feedback sub-frames and feedback channel resources are allocated to at least two groups of downlink sub-frames.

Preferably a different CSI feedback periodicity and a different feedback sub-frame and feedback channel resource are allocated to each of the groups of downlink sub-frames; and if a feedback sub-frame corresponds to a plurality of groups of downlink sub-frames, then the second processing module 710 feeds back, in the feedback sub-frame, the DL CSI measured in one of the plurality of groups of downlink sub-frames.

Preferably the same CSI feedback periodicity, the same feedback sub-frame and the same feedback channel resource are allocated to at least two groups of downlink sub-frames; and if a feedback sub-frame corresponds to a plurality of groups of downlink sub-frames, then the second processing module 710 feeds back, in the feedback sub-frame, the DL CSI measured in each of the corresponding groups of downlink sub-frames.

Preferably the channel measurement configuration information comprises downlink sub-frames included in each of the groups of downlink sub-frames and a CSI measurement periodicity corresponding to the group of downlink sub-frames; and the second processing module 710 selects a downlink sub-frame from a group of downlink sub-frames as a DL CSI measurement sub-frame and measures the DL CSI at the corresponding CSI measurement periodicity.

Preferably the channel measurement configuration information comprises a correspondence relationship between a CSI measurement sub-frame and a group of downlink sub-frames, and a corresponding CSI measurement periodicity, where one CSI measurement sub-frame corresponds to one group of downlink sub-frames; and the second processing module 710 measures the DL CSI in the DL CSI measurement sub-frame corresponding to the group of downlink sub-frames at the corresponding CSI measurement periodicity.

Preferably the second processing module 710 feeds back the measurement result after triggered by the network side device.

Preferably the second processing module 710 feeds back the measurement result upon determining that the feedback is required according to CQI request information in a received UL grant of the network side device.

Preferably when 1 bit is occupied by the CQI request information, the bit indicates whether to trigger a feedback.

Preferably if the UL grant carrying the CQI request information schedules PUSCH transmission of the sub-frame n, and the CQI request information indicates that CSI needs to be fed back, then the second processing module 710 feeds back, the DL CSI measured in the sub-frame n−k, in the sub-frame n over the PUSCH, where k≥m, m is a processing time period of the user equipment by taking a sub-frame as unit, and the sub-frame n−k is a DL CSI measurement sub-frame closest to the sub-frame n.

Preferably if the UL grant carrying the CQI request information schedules PUSCH transmission of the sub-frame n, and the CQI request information indicates that CSI needs to be fed back, then the second processing module 710 feeds back, the DL CSI measured in the sub-frame n−$k_i$, in the sub-frame n over the PUSCH; where $k_i \geq m$, m is a processing time period of the user equipment by taking a sub-frame as unit, the sub-frame n−$k_i$ is a DL CSI measurement sub-frame in the i-th group of downlink sub-frames closest to the sub-frame n, i is a positive integer smaller than or equal to N, and N is the number of the groups of downlink sub-frames.

Preferably a plurality of bits are occupied by the CQI request information; and the second processing module 710 determines a group of downlink sub-frames corresponding to a bit value of the CQI request information according to a correspondence relationship between the group of downlink sub-frames and the bit value and feeds back the DL CSI measured in the DL CSI measurement sub-frame in the determined group of downlink sub-frames; or determines a set of downlink sub-frames corresponding to a bit value of the CQI request information according to a correspondence relationship between the set of downlink sub-frames and the bit value and feeds back the DL CSI measured in a DL CSI measurement sub-frame in a group of downlink sub-frames in the determined set of downlink sub-frames, where one set of downlink sub-frames includes at least one group of downlink sub-frames.

Preferably if the UL grant carrying the CQI request information schedules PUSCH transmission of the sub-frame n, and the CQI request information indicates that CSI needs to be fed back, then the second processing module 710 feeds back, the DL CSI measured in the sub-frame n−$k_i$, in the sub-frame n over the PUSCH; where $k_i \geq m$, m is a processing time period of the user equipment by taking a sub-frame as unit, the sub-frame n−$k_i$ is a DL CSI measurement sub-frame in the i-th group of downlink sub-frames closest to the sub-frame n, i is a positive integer smaller than or equal to N, i is an index of a group of downlink sub-frames for which a feedback triggered by the CQI request information is required, and N is the number of the groups of downlink sub-frames.

Based upon the same inventive idea, embodiments of the invention further provide a method for DL CSI feedback and a method for configuring channel measurement. Since these methods address the problem under a principle similar to that of the system for DL CSI feedback according to the embodiment of the invention, reference can be made to the implementations of the system for implementations of these methods, so a repeated description thereof will be omitted here.

Figure 8:
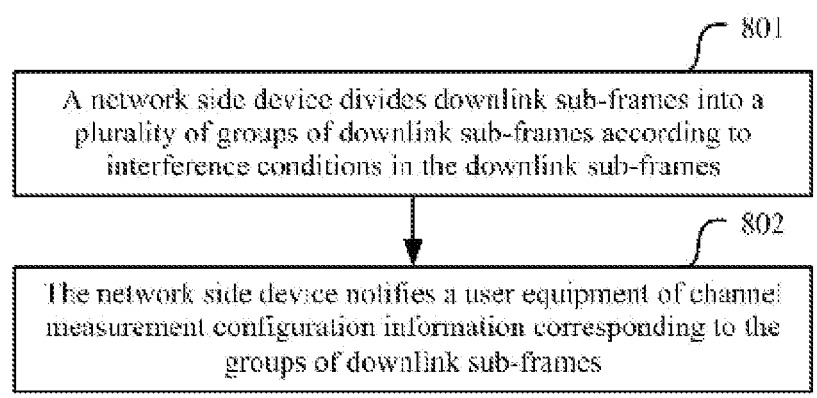
FIG. 8 is a schematic flow chart of a method for DL CSI feedback according to an embodiment of the invention.

As illustrated in FIG. 8, a method for configuring channel measurement according to an embodiment of the invention includes the following operations:

Operation 801: a network side device divides downlink sub-frames into a plurality of groups of downlink sub-frames according to interference conditions in the downlink sub-frames; and Operation 802: the network side device notifies a user equipment of channel measurement configuration information corresponding to the groups of downlink sub-frames.

In an implementation, all the channel measurement configuration information of the groups of downlink sub-frames resulting from division by the network side device may not be notified to the same user equipment but the network side device can select one of the groups of downlink sub-frames of which the channel measurement configuration information is notified to the user equipment.

Particularly two schemes for DL CSI feedback are provided in the embodiments of the invention, i.e., periodically and non-periodically, as described respectively below.

I. DL CSI is Fed Back Periodically.

Particularly in the operation 801, the network side device notifies the user equipment of the downlink sub-frames included in the groups of downlink sub-frames.

Particularly in the operation 802, the network side device takes a feedback periodicity of periodical CSI, a feedback sub-frame and a feedback channel resource as the channel measurement configuration information corresponding to a group of downlink sub-frames and notifies the user equipment of the channel measurement configuration information through signaling.

Particularly the network side device determines the feedback periodicity of periodical CSI, the feedback sub-frame and the feedback channel resource corresponding to the group of downlink sub-frames and takes the determined feedback periodicity of periodical CSI, feedback sub-frame and feedback channel resource corresponding to the group of downlink sub-frames as the channel measurement configuration information corresponding to the group of downlink sub-frames.

There are a number of particular feedback schemes, several of which will be exemplified below.

In a first feedback scheme, the network side device allocates feedback channel resources (for example, a part of them are the same, all of them are the same or none of them is the same as any other), the same CSI feedback periodicity and different feedback sub-frames (for example, a part of them are the same or none of them is the same as any other) to at least two groups of downlink sub-frames.

In a second feedback scheme, the network side device allocates feedback channel resources (for example, a part of them are the same, all of them are the same or none of them is the same as any other), different CSI feedback periodicities (for example, a part of them are the same or none of them is the same as any other) and different feedback sub-frames (for example, a part of them are the same or none of them is the same as any other) to at least two groups of downlink sub-frames.

In a third feedback scheme, the network side device allocates the same CSI feedback periodicity, the same feedback sub-frame and the same feedback channel resource to at least two groups of downlink sub-frames.

In a fourth feedback scheme which is the combination of the third feedback scheme with the first feedback scheme or the second feedback scheme, when there are more than two groups of downlink sub-frames, the network side device further divides the groups of downlink sub-frames into a plurality of sets of sub-frames, where each set of sub-frames includes one or more groups of downlink sub-frames. The third feedback scheme is used in each set of sub-frames, and the first feedback scheme or the second feedback scheme is used between the sets of sub-frames.

II. DL CSI is Fed Back Non-Periodically.

Particularly the network side device configures each of the groups of downlink sub-frames with a DL CSI measurement sub-frame and notifies the user equipment through signaling.

There are two particular schemes for configuring the DL CSI measurement sub-frame as described respectively below.

In a first configuration scheme, the network side device takes downlink sub-frames included in each group of downlink sub-frames and a CSI measurement periodicity corresponding to the each group of downlink sub-frames as the channel measurement configuration information corresponding to the group of downlink sub-frames.

In a second configuration scheme, the network side device takes a correspondence relationship between each CSI measurement sub-frame and a group of downlink sub-frames, and a CSI measurement periodicity corresponding to the group of downlink sub-frames as the channel measurement configuration information corresponding to the group of downlink sub-frames, where one CSI measurement sub-frame corresponds to one group of downlink sub-frames.

Due to the non-periodical feedback, the network side device further needs to trigger the user equipment to feed back the DL CSI of at least one of the groups of downlink sub-frames after configuring each of the groups of downlink sub-frames with the DL CSI measurement sub-frame.

Preferably after the operation 802, the network side device can trigger the user equipment to feed back the DL CSI of at least one of the groups of downlink sub-frames over a corresponding PUSCH resource through CQI request information in a UL grant.

There are a number of trigger schemes by the CQI request information in the UL grant, several of which will be exemplified below.

1 bit is occupied by the CQI request information, and the bit indicates whether to trigger a feedback.

A plurality of bits are occupied by the CQI request information, and a plurality of bit combinations of the CQI request information indicate one of the groups of downlink sub-frames for which the DL CSI is fed back by the user equipment.

Particularly the network side device determines a bit value corresponding to a group of downlink sub-frames, for which a feedback is required, according to a correspondence relationship between the group of downlink sub-frames and the bit value, determines the CQI request information according to the determined bit value and notifies the user equipment of the determined CQI request information.

In a fourth trigger scheme, a plurality of bits are occupied by the CQI request information. When there are a number of groups of downlink sub-frames, the groups of downlink sub-frames are further divided into sets, each of which includes more than one group of downlink sub-frames. A plurality of bit combinations of the CQI request information indicate one of the sets with the group of downlink sub-frames for which the DL CSI is fed back by the user equipment.

Particularly the network side device determines a bit value corresponding to a set of downlink sub-frames, for which a feedback is required, according to a correspondence relationship between the set of downlink sub-frames and the bit value, determines the CQI request information according to the determined bit value and notifies the user equipment of the determined CQI request information, where one set of downlink sub-frames includes at least one group of downlink sub-frames.

Based on the method described above, the network side device obtains the downlink CSI information corresponding to the groups of downlink sub-frames through receiving the feedback information of the user equipment.

Figure 9:
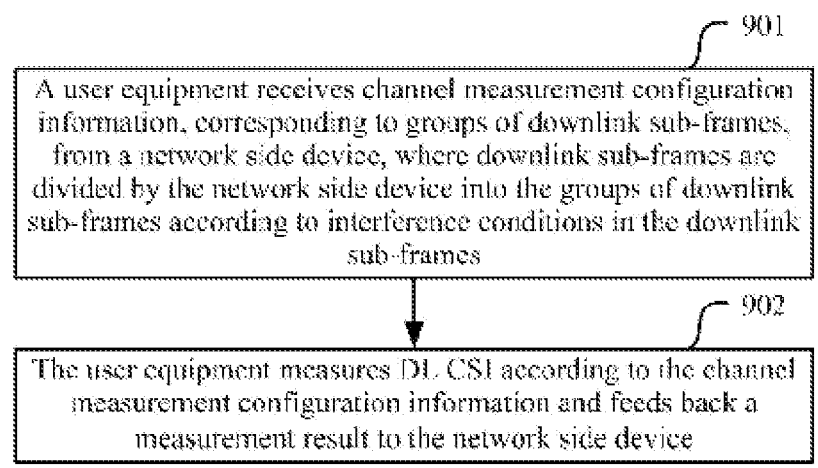
FIG. 9 is a schematic flow chart of a method for configuring channel measurement according to an embodiment of the invention.

As illustrated in FIG. 9, a method for DL CSI feedback according to an embodiment of the invention includes the following operations:

Operation 901: a user equipment receives channel measurement configuration information, corresponding to groups of downlink sub-frames, from a network side device, where downlink sub-frames are divided by the network side device into the groups of downlink sub-frames according to interference conditions in the downlink sub-frames; and Operation 902: the user equipment measures DL CSI according to the channel measurement configuration information and feeds back a measurement result to the network side device.

Particularly two schemes for DL CSI feedback are provided in the embodiments of the invention, i.e., periodically and non-periodically, as described respectively below.

I. DL CSI is Fed Back Periodically.

The user equipment receives a notification of the downlink sub-frames included in the groups of downlink sub-frames from the network side device.

Preferably the network side device takes a feedback periodicity of periodical CSI, a feedback sub-frame and a feedback channel resource as the channel measurement configuration information corresponding to each of the groups of downlink sub-frames; and correspondingly the user equipment feeds back the DL CSI, measured in the corresponding group of downlink sub-frames, in the feedback sub-frame over the feedback channel resource at the feedback periodicity of periodical CSI.

There are a number of particular feedback schemes, several of which will be exemplified below.

In a first feedback scheme, the network side device allocates feedback channel resources (for example, a part of them are the same, all of them are the same or none of them is the same as any other), the same CSI feedback periodicity and different feedback sub-frames (for example, a part of them are the same or none of them is the same as any other) to at least two groups of downlink sub-frames.

The user equipment feeds back the DL CSI, measured in corresponding one of the groups of sub-frames, at a corresponding sub-frame location at a time.

In a second feedback scheme, the network side device allocates feedback channel resources (for example, a part of them are the same, all of them are the same or none of them is the same as any other), different CSI feedback periodicities (for example, a part of them are the same or none of them is the same as any other) and different feedback sub-frames (for example, a part of them are the same or none of them is the same as any other) to at least two groups of downlink sub-frames.

The user equipment feeds back the DL CSI, measured in corresponding one of the groups of sub-frames, at a corresponding sub-frame location at a time.

If a feedback sub-frame corresponds to a plurality of groups of downlink sub-frames, then the user equipment feeds back, in the feedback sub-frame, the DL CSI measured in one of the plurality of groups of downlink sub-frames.

In a third feedback scheme, the network side device allocates the same CSI feedback periodicity, the same feedback sub-frame and the same feedback channel resource to at least two groups of downlink sub-frames.

The user equipment feeds back the DL CSI, measured in corresponding one of the groups of sub-frames, at a corresponding sub-frame location at a time.

If a feedback sub-frame corresponds to a plurality of groups of downlink sub-frames, then the user equipment feeds back, in the feedback sub-frame, the DL CSI measured in each corresponding group of downlink sub-frames.

In a fourth feedback scheme which is the combination of the third feedback scheme with the first feedback scheme or the second feedback scheme, when there are more than two groups of downlink sub-frames, the network side device further divides the groups of downlink sub-frames into a plurality of sets of sub-frames, where each set of sub-frames includes one or more groups of downlink sub-frames. The third feedback scheme is used in each set of sub-frames, and the first feedback scheme or the second feedback scheme is used between the sets of sub-frames.

II. DL CSI is Fed Back Non-Periodically.

Particularly the network side device configures each of the groups of downlink sub-frames with a DL CSI measurement sub-frame, and the user equipment measures DL CSI in the corresponding downlink sub-frame.

There are two particular schemes for configuring the DL CSI measurement sub-frame as described respectively below.

In a first configuration scheme, if the network side device takes downlink sub-frames included in each group of downlink sub-frames and a CSI measurement periodicity corresponding to the each group of downlink sub-frames as the channel measurement configuration information corresponding to the group of downlink sub-frame, then:

the user equipment selects a downlink sub-frame from a group of downlink sub-frames as a DL CSI measurement sub-frame and measures DL CSI at the corresponding CSI measurement periodicity.

Particularly the user equipment selects a downlink sub-frame in each group of downlink sub-frames per the periodicity to measure DL CSI and stores the measurement result.

In a second configuration scheme, the network side device takes a correspondence relationship between each CSI measurement sub-frame and a group of downlink sub-frames, and a CSI measurement periodicity corresponding to the group of downlink sub-frames as the channel measurement configuration information corresponding to the group of downlink sub-frames, where one CSI measurement sub-frame corresponds to one group of downlink sub-frames.

The user equipment measures DL CSI in the DL CSI measurement sub-frame corresponding to the group of downlink sub-frames at the corresponding CSI measurement periodicity.

Preferably in the operation 902, the user equipment feeds back the measurement result upon determining that the feedback is required according to the CQI request information in the received UL grant of the network side device.

There are a number of trigger schemes by the CQI request information in the UL grant, several of which will be exemplified below.

In a first trigger scheme, 1 bit is occupied by the CQI request information, and the bit indicates whether to trigger the feedback.

Preferably if the UL grant carrying the CQI request information schedules PUSCH transmission of the sub-frame n, and the CQI request information indicates that CSI needs to be fed back, then the user equipment feeds back, the DL CSI measured in the sub-frame n−k, in the sub-frame n over the PUSCH, where k≥the processing time period of the user equipment, and the sub-frame n−k is a DL CSI measurement sub-frame closest to the sub-frame n.

In a second trigger scheme, 1 bit is occupied by the CQI request information, and the bit indicates whether to trigger the feedback.

Preferably if the UL grant carrying the CQI request information schedules PUSCH transmission of the sub-frame n, and the CQI request information indicates that CSI needs to be fed back, then the user equipment feeds back, the DL CSI measured in the sub-frame n−$k_i$, in the sub-frame n over the PUSCH, where $k_i$≥the processing time period of the user equipment, the sub-frame n−$k_i$ is a DL CSI measurement sub-frame in the i-th group of downlink sub-frames closest to the sub-frame n, i is a positive integer smaller than or equal to N, and N is the number of the groups of downlink sub-frames.

In a third trigger scheme, a plurality of bits are occupied by the CQI request information, and a plurality of bit combinations of the CQI request information indicate one of the groups of downlink sub-frames for which the DL CSI is fed back by the user equipment.

Particularly the user equipment determines a group of downlink sub-frames corresponding to a bit value of the CQI request information according to a correspondence relationship between the group of downlink sub-frames and the bit value and feeds back the DL CSI measured in the DL CSI measurement sub-frame in the determined group of downlink sub-frames.

Preferably if the UL grant carrying the CQI request information schedules PUSCH transmission of the sub-frame n, and the CQI request information indicates that CSI needs to be fed back, then the user equipment feeds back, the DL CSI measured in the sub-frame $n-k_i$, in the sub-frame n over the PUSCH, where $k_i \geq m$, m is a processing time period of the user equipment by taking a sub-frame as unit, the sub-frame $n-k_i$ is a DL CSI measurement sub-frame in the i-th group of downlink sub-frames closest to the sub-frame n, i is a positive integer smaller than or equal to N, i is an index of a group of downlink sub-frames for which a feedback triggered by the CQI request information is required, and N is the number of the groups of downlink sub-frames.

In a fourth trigger scheme, a plurality of bits are occupied by the CQI request information. When there are a number of groups of downlink sub-frames, the groups of downlink sub-frames are further divided into sets, each of which includes more than one group of downlink sub-frames. A plurality of bit combinations of the CQI request information indicate one of the sets with the group of downlink sub-frames for which the DL CSI is fed back by the user equipment.

Particularly the user equipment determines a set of downlink sub-frames corresponding to a bit value of the CQI request information according to a correspondence relationship between the set of downlink sub-frames and the bit value and feeds back the DL CSI measured in the DL CSI measurement sub-frame in the group of downlink sub-frames in the determined set of downlink sub-frames, where one set of downlink sub-frames includes at least one group of downlink sub-frames.

Preferably if the UL grant carrying the CQI request information schedules PUSCH transmission of the sub-frame n, and the CQI request information indicates that CSI needs to be fed back, then the user equipment feeds back, the DL CSI measured in the sub-frame $n-k_i$, in the sub-frame n over the PUSCH, where $k_i \geq m$, m is a processing time period of the user equipment by taking a sub-frame as unit, the sub-frame $n-k_i$ is a DL CSI measurement sub-frame in the i-th group of downlink sub-frames closest to the sub-frame n, i is a positive integer smaller than or equal to N, i is an index of a group of downlink sub-frames for which a feedback triggered by the CQI request information is required, and N is the number of the groups of downlink sub-frames.

Particularly FIG. 8 and FIG. 9 can be integrated into a flow of a method for DL CSI feedback, that is, firstly the operation 801 and the operation 802 and then the operation 901 and the operation 902 are performed.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:
1. A method for configuring channel measurement, comprising:
    a network side device dividing downlink sub-frames into a plurality of groups of downlink sub-frames; and
    the network side device notifying a user equipment of channel measurement configuration information corresponding to the groups of downlink sub-frames;

wherein after the network side device notifies the user equipment of the channel measurement configuration information corresponding to the groups of downlink sub-frames, the method further comprises:
the network side device triggering the user equipment to feed back downlink Channel State Information, DL CSI, of at least one of the groups of downlink sub-frames,
wherein the network side device triggering the user equipment to feed back the DL CSI of at least one of the groups of downlink sub-frames comprises:
the network side device triggering the user equipment to feed back the DL CSI of at least one of the groups of downlink sub-frames through Channel Quality Indicator, CQI, request information in an uplink, UL, grant;
wherein a plurality of bits are occupied by the CQI request information; and
the network side device triggering the user equipment to feed back the DL CSI of at least one of the groups of downlink sub-frames through the CQI request information in the UL grant comprises:
the network side device determining a bit value corresponding to a group of downlink sub-frames, for which a feedback is required, according to a correspondence relationship between the group of downlink sub-frames and the bit value, determining the CQI request information according to the determined bit value and notifying the user equipment of the determined CQI request information; or
the network side device determining a bit value corresponding to a set of downlink sub-frames, for which a feedback is required, according to a correspondence relationship between the set of downlink sub-frames and the bit value, determining the CQI request information according to the determined bit value and notifying the user equipment of the determined CQI request information, wherein one set of downlink sub-frames includes at least one group of downlink sub-frames.

2. The method according to claim 1, wherein before the network side device notifies the user equipment of the channel measurement configuration information corresponding to the groups of downlink sub-frames, the method further comprises:
the network side device taking downlink sub-frames included in each of the groups of downlink sub-frames and a CSI measurement periodicity corresponding to the group of downlink sub-frame as channel measurement configuration information corresponding to the group of downlink sub-frame; or
the network side device taking a correspondence relationship between each CSI measurement sub-frame and a group of downlink sub-frames, and a CSI measurement periodicity corresponding to the group of downlink sub-frames as channel measurement configuration information corresponding to the group of downlink sub-frames, wherein one CSI measurement sub-frame corresponds to one group of downlink sub-frames.

3. A method for downlink Channel State Information, DL CSI, feedback, comprising:
a user equipment receiving channel measurement configuration information, corresponding to groups of downlink sub-frames, from a network side device, wherein downlink sub-frames are divided by the network side device into the groups of downlink sub-frames; and
the user equipment measuring DL CSI according to the channel measurement configuration information and feeding back a measurement result to the network side device;
wherein the user equipment feeding back the measurement result to the network side device comprises:
the user equipment feeding back the measurement result after triggered by the network side device;
wherein the user equipment feeding back the measurement result comprises:
the user equipment feeding back the measurement result upon determining that the feedback is required according to Channel Quality Indicator, CQI, request information in a received uplink, UL, grant of the network side device;
wherein a plurality of bits are occupied by the CQI request information; and
the user equipment feeding back the measurement result comprises:
the user equipment determining a group of downlink sub-frames corresponding to a bit value of the CQI request information according to a correspondence relationship between the group of downlink sub-frames and the bit value and feeding back the DL CSI measured in a DL CSI measurement sub-frame in the determined group of downlink sub-frames; or
the user equipment determining a set of downlink sub-frames corresponding to a bit value of the CQI request information according to a correspondence relationship between the set of downlink sub-frames and the bit value and feeding back the DL CSI measured in a DL CSI measurement sub-frame in a group of downlink sub-frames in the determined set of downlink sub-frames, wherein one set of downlink sub-frames includes at least one group of downlink sub-frames.

4. The method according to claim 3, wherein the channel measurement configuration information comprises downlink sub-frames included in each of the groups of downlink sub-frames and a CSI measurement periodicity corresponding to the group of downlink sub-frames; and
the user equipment measuring the DL CSI according to the channel measurement configuration information comprises:
the user equipment selecting a downlink sub-frame from a group of downlink sub-frames as a DL CSI measurement sub-frame and measuring the DL CSI at a corresponding CSI measurement periodicity.

5. The method according to claim 3, wherein the channel measurement configuration information comprises a correspondence relationship between a CSI measurement sub-frame and a group of downlink sub-frames, and a corresponding CSI measurement periodicity, wherein one CSI measurement sub-frame corresponds to one group of downlink sub-frames; and
the user equipment measuring the DL CSI according to the channel measurement configuration information comprises:
the user equipment measuring the DL CSI in a DL CSI measurement sub-frame corresponding to the group of downlink sub-frames at the corresponding CSI measurement periodicity.

6. The method according to claim 3, wherein the user equipment feeding back the measurement result comprises:
if the UL grant carrying the CQI request information schedules PUSCH transmission of a sub-frame n, and the CQI request information indicates that CSI needs to be fed back, then the user equipment feeding back, the DL CSI measured in a sub-frame n−$k_i$, in the sub-frame n over the PUSCH;

wherein $k_i \geq m$, m is a processing time period of the user equipment by taking a sub-frame as unit, the sub-frame n−$k_i$ is a DL CSI measurement sub-frame in the i-th group of downlink sub-frames closest to the sub-frame n, i is a positive integer smaller than or equal to N, i is an index of a group of downlink sub-frames for which a feedback triggered by the CQI request information is required, and N is the number of the groups of downlink sub-frames.

7. A network side device for configuring channel measurement, comprising:

a dividing module configured to divide downlink sub-frames into a plurality of groups of downlink sub-frames; and a first processing module configured to notify a user equipment of channel measurement configuration information corresponding to the groups of downlink sub-frames;

wherein the first processing module triggers the user equipment to feed back downlink Channel State Information, DL CSI, of at least one group of downlink sub-frames;

wherein the first processing module triggers the user equipment to feed back the DL CSI of at least one group of downlink sub-frames through Channel Quality Indicator, CQI, request information in a UL grant;

wherein a plurality of bits are occupied by the CQI request information; and the first processing module determines a bit value corresponding to a group of downlink sub-frames, for which a feedback is required, according to a correspondence relationship between the group of downlink sub-frames and the bit value, determines the CQI request information according to the determined bit value and notifies the user equipment of the determined CQI request information; or determines a bit value corresponding to a set of downlink sub-frames, for which a feedback is required, according to a correspondence relationship between the set of downlink sub-frames and the bit value, determines the CQI request information according to the determined bit value and notifies the user equipment of the determined CQI request information, where one set of downlink sub-frames includes at least one group of downlink sub-frames.

8. A user equipment for downlink Channel State Information, DL CSI, feedback, comprising:

a receiving module configured to receive channel measurement configuration information, corresponding to groups of downlink sub-frames, from a network side device, wherein downlink sub-frames are divided by the network side device into the groups of downlink sub-frames; and a second processing module configured to measure DL CSI according to the channel measurement configuration information and feeding back a measurement result to the network side device;

wherein the second processing module feeds back the measurement result after triggered by the network side device;

wherein the second processing module feeds back the measurement result upon determining that the feedback is required according to Channel Quality Indicator, CQI, request information in a received UL grant of the network side device;

wherein a plurality of bits are occupied by the CQI request information; and the second processing module determines a group of downlink sub-frames corresponding to a bit value of the CQI request information according to a correspondence relationship between the group of downlink sub-frames and the bit value and feeds back the DL CSI measured in the DL CSI measurement sub-frame in the determined group of downlink sub-frames; or determines a set of downlink sub-frames corresponding to a bit value of the CQI request information according to a correspondence relationship between the set of downlink sub-frames and the bit value and feeds back the DL CSI measured in a DL CSI measurement sub-frame in a group of downlink sub-frames in the determined set of downlink sub-frames, where one set of downlink sub-frames includes at least one group of downlink sub-frames.

* * * * *